United States Patent [19]
Broll et al.

[11] 3,802,900
[45] Apr. 9, 1974

[54] ZIRCONIUM CERAMIC COLOR BODIES

[75] Inventors: Arno Broll, Rothenbergen; Hermann Beyer, Grossauheim; Herbert Mann, Dornigheim; Eugen Meyer-Simon, Frankfurt, all of Germany

[73] Assignee: Deutsche Geld- und Silber-Scheideanstalt vormals Roessler, Frankfurt am Main, Germany

[22] Filed: May 1, 1973

[21] Appl. No.: 356,167

[30] Foreign Application Priority Data
May 5, 1972  Austria..........................3969/72

[52] U.S. Cl............. 106/288 B, 106/299, 106/293, 106/301, 106/292
[51] Int. Cl............................................. C08h 17/02
[58] Field of Search.......... 106/288, 299, 293, 292, 106/301

[56] References Cited
UNITED STATES PATENTS

| | | | |
|---|---|---|---|
| 2,875,085 | 2/1959 | Morris et al. | 106/299 |
| 1,719,432 | 1/1927 | Kinzie | 106/299 |
| 3,012,899 | 12/1961 | Giordano | 106/301 |

FOREIGN PATENTS OR APPLICATIONS

| | | | |
|---|---|---|---|
| 1,202,986 | 8/1970 | Great Britain | 106/299 |

*Primary Examiner*—Delbert E. Gantz
*Assistant Examiner*—Juanita M. Nelson
*Attorney, Agent, or Firm*—Cushman, Darby & Cushman

[57] ABSTRACT

A plural phase ceramic zirconium silicate pigment is prepared that there are included in clear crystals of glaze stable zirconium silicate sulfides, selenides, tellurides of zinc, cadmium, mercury or mixed crystals of these compounds as a separate internal phase.

9 Claims, No Drawings

ZIRCONIUM CERAMIC COLOR BODIES

The invention concerns ceramic pigments based on zirconium silicates.

There are known a few zirconium silicate based ceramic pigments in which the formation of zirconium silicate occurs in the presence of transition metal oxides. Thereby there are formed homogeneously colored $ZrSiO_4$ crystals. Hereby color-imparting transition metal ions are built into the crystal lattice of the zirconium silicate.

Corresponding fire stable colors until now have only been obtained with transition metals of the first large period and the rare earths. Among these very glaze stable zirconium silicates there are known zirconium-vanadium blue, $ZrSiO_4$ with included vanadium ions, praseodymium yellow, $ZrSiO_4$ with included praseodymium and a blue-green zirconium silicate with included chromium ions as well as zirconium iron rose.

Intensely colored red or orange pigments which are not attacked or are only slightly attacked in the glaze baking by the glazing flux are not known either based on zirconium silicate or on other glaze stable systems. Therefore until now the workers in the art have had to be limited in red ceramic pigments to the slightly stable and weakly colored manganese rose ($Al_2O_3/Mn_2O_3$), chrome rose ($Zn(Al,Cr)_2O_4$) and zirconium iron rose and pink ($Ca(Sn, Cr) SiO_5$).

Intensely colored yellow to red compounds such as the cadmium-sulfide-selenides cannot be used universally as ceramic pigments because they are too easily destroyed in the glaze baking.

There are also known red glazes with cadmium-sulfide-selenide as coloring agent. In these the color imparting cadmium-sulfide-selenide is formed in finely divided form for the first time in the glaze baking. However, since cadmium-sulfide-selenide is very sensitive to oxidation, the development of the pigment can take place only in special relatively low melting glazes. However, since a glaze is harder the higher it is fired, the red glazes are quite weak and have heat expansion coefficients which do not permit a glaze of the customary body. Therefore the selenium red glazes do not satisfy the requirements generally placed on glazes colored with ceramic pigments because of their low hardness, the frequently occurring stress cracks, their black bordering precipitates and their irregularity of color.

The invention is concerned with producing ceramic pigments based on zirconium silicate which include inside the clear zirconium silicate crystals as a separate phase the sulfides, selenides and tellurides of zinc, cadmium and mercury or mixed crystals of these. Thus there can be used cadmium selenide, cadmium sulfide, cadmium telluride, mercury (II) sulfide, mercury (II) selenide, zinc selenide, zinc sulfide and zinc telluride.

In contrast to the previously known zirconium silicate pigments no ions are statistically distributed in the $ZrSiO_4$ crystal lattice, but particles of yellow to red (Zn,Cd,Hg)(S,Se,Te) with extend up to several microns, are included in the zirconium silicate crystals. It is especially surprising that sulfides, selenides and sulfide-selenides which differ so strongly from zirconium silicate both chemically and structurally can be enclosed in a $ZrSiO_4$-crystallite.

Especially intense pigments are obtained if the sulfide, selenide or telluride or their mixed crystals are formed during the synthesis of the zirconium silicate. In such case as starting material there is preferably added the zinc, cadmium, mercury and sulfur in the form of their oxygen compounds. As the sulfur containing raw material there are especially well suited sodium sulfite or sodium thiosulfate.

If, for example, a mixture of zirconium oxide, silicon dioxide, cadmium oxide, sulfur and selenium is calcined under conditions which permit the formation of zirconium silicate (which can happen with the addition of a mineralizer from 600°C. or without a mineralizer above 1100°C.), there is formed zirconium silicate and cadmium sulfide selenide. Both compounds can be identified by X-rays or microscopically, however, a greater part of the cadmium-sulfide-selenide small crystals are inclosed in the zirconium silicate. Non-inclosed Cd(S,Se) can be removed, for example, with $HNO_3$. The final product is a glaze stable red pigment which is also stable against concentrated acids and air oxidation above 1000°C. and even over 1200°C.

For the synthesis of zirconium silicate there can also be employed zirconium oxide and silicon dioxide producing compounds such as sodium zirconium silicate ($Na_2Zr_2SiO_5$). To form the cadmium sulfide selenide there can be used cadmium and cadmium containing compounds, for example $CdCO_3$, $CdSO_4$, CdO, CdS, CdSe and compounds which contain sulfur such as $Na_2SO_4$, $Na_2SO_3$, $Na_2S_2O_5$, $Na_2S_2O_3$, $Na_2S_2O_4$, $Na_2S$ or the corresponding selenium salts, e.g. $Na_2Se_2O_4$, $Na_2SeO_3$, $Na_2Se_2O_5$, $Na_2Se_2O_3$, $Na_2Se_2O_4$ and $Na_2Se_2$ and their mixed crystals. The cadmium chalcogenide formed should make up 1 to 50 percent or even up to 70 percent of zirconium silicate by weight. By addition of reducing agents (for example sugar, e.g. sucrose, or starch) the effectiveness of the oxidic sulfur and selenium compound can be improved. The color of the $Cd(S_xSe_{1-x})$ inclusion can be varied according to the sulfur and selenium portions from yellow ($x$ is 1). to red ($x < 1$).

Like the cadmium the zinc and mercury can be added as oxygen containing compounds, e.g. ZnO, $ZnCO_3$, HgO and $HgCO_3$.

Color changes of the inclusions can also be produced by the formation of mixed crystals between $Cd(S_xSe_{1-x})$ and other metal chalcogenides (Zn, Hg) (S,Se).

Thus there are formed light yellow pigments, if mixed crystals of CdS and ZnS with up to 50 mol % zinc are inclosed in the zirconium silicate according to the above mentioned process and orange colored pigments if mixed crystals of CdS and HgS with up to 100 mol % of mercury are inclosed.

Instead of colorless zirconium silicates there can also be used colored zirconium silicates. If the well known praseodymium yellow is synthesized in the presence of CdS there is obtained a very intensive praseodymium-yellow pigment with CdS inclusions. Likewise it is possible to inclose CdS in vanadium blue. A green pigment is thereby formed.

Unless otherwise indicated all parts and percentages are by weight.

EXAMPLE 1

An intimate mixture of 2381 grams of $ZrO_2$, 1174 grams of $SiO_2$, 950 grams of $CdCO_3$, 129 grams of Se, 188 grams of S and 178 grams of LiF were kneaded for 15 minutes with 1300 ml of water, poured into a correspondingly large crucible and heated to 900°C for 1 h. After the grinding of the reaction mixture and the dissolving of the non-inclosed cadmium sulfide selenide there remained a glaze stable light red pigment.

EXAMPLE 2

85 grams of $ZrO_2$, 42 grams of $SiO_2$, 34 grams of $CdO_3$, 4.1 grams of Se, 3 grams of LiF and 52 grams of $Na_2SO_3$ were well mixed and kneaded with 45 ml of water. The kneaded mixture was calcined in the crucible at 900°C for 1 h. and worked up as in example 1. There was obtained a bright red glaze stable pigment.

EXAMPLE 3

85 grams of $ZrO_2$, 42 grams of $SiO_2$, 34 grams of $CdCO_3$, 1.8 grams of $Na_2SeO_3$, 26 grams of $Na_2SO_3$, 6.32 grams of LiF and 3.6 grams of sugar (sucrose) were mixed intensely and kneaded with 40 ml of water. The mixture was heated in a crucible to 950°C for 1 h. and after working up gave an orange colored glaze stable pigment.

EXAMPLE 4

85 grams of $ZrO_2$, 42 grams of $SiO_2$, 50 grams of $CdSO_4$, 25 grams of $Na_2SO_3$, 6.3 grams of LiF and 3.6 grams of sugar were well mixed and wet kneaded. After calcining at 950°C for 1 h. and dissolving the cadmium sulfide which was not enclosed, there was obtained a pure yellow glaze stable pigment.

EXAMPLE 5

85 grams of $ZrO_2$, 42 grams of $SiO_2$, 27 grams of $CdCO_3$, 6.3 grams of sulfur, 26 grams of $Na_2SO_3$, 6.3 grams of LiF and 3.2 grams of ZnO were kneaded with 45 ml of water and calcined in the crucible at 1000°C for 1 h. The product was worked up as in example 1. There was obtained a light yellow pigment.

EXAMPLE 6

85 grams of $ZrO_2$, 42 grams of $SiO_2$, 30 grams of $CdCO_3$, 3 grams of Se, 26 grams of $Na_2SO_3$, 6.3 grams of LiF, 4.6 grams of HgS and 3.6 grams of starch were thoroughly mixed and made into a paste with 45 ml of water. After the calcining at 900°C for 1 h. and dissolving of the non-inclosed sulfide with $HNO_3$ there remained an orange-yellow glaze stable pigment.

EXAMPLE 7

There were mixed 85 grams of $ZrO_2$, 42 grams of $SiO_2$, 34 grams of $CdCO_3$, 6.3 grams of sulfur, 26 grams of $Na_2SO_3$, 6.3 grams of LiF and 4 grams of $Pr_6O_{11}$ and made into a paste with 45 ml of water. Upon calcining at 980°C for 1 h. there was formed an intensively yellow pigment which was freed of non-inclosed CdS by treatment with $HNO_3$. The glaze stable yellow pigment consisted of microscopically small yellow zirconium silicate crystals having cadmium sulfide inclusions.

EXAMPLE 8

The same raw mixture was used as in example 7 but replacing the praseodymium oxide by 9 grams of $NH_4VO_3$. The procedure employed was analogous to that of example 7 and there was obtained a glaze stable green pigment that consisted of blue small zirconium silicate crystals having yellow cadmium sulfide inclosures.

EXAMPLE 9

85 grams of $ZrO_2$, 42 grams of $SiO_2$, 34 grams of $CdCO_3$, 26 grams of $Na_2SO_3$, 6.3 grams of LiF, 3.3 grams of tellurium and 3 grams of sucrose were made into a paste, dried and again ground. After calcining at 950°C for 1 h. in the crucible the reaction product was ground and boiled with $HNO_3$. There was obtained a rose pigment.

What is claimed is:

1. A plural phase zirconium silicate based ceramic pigment comprising clear crystals of zirconium silicate having enclosed therein colored chalcogenide of zinc, cadmium or mercury or mixed crystals of these chalcogenides, and where the chalcogen has an atomic weight of 32 to 128.

2. A ceramic pigment according to claim 1 wherein the zirconium silicate phase is devoid of coloring.

3. A ceramic pigment according to claim 1 wherein the zirconium silicate is colored zirconium silicate.

4. A ceramic pigment according to claim 3 wherein the zirconium silicate phase is colored by praseodymium ions.

5. A ceramic pigment according to claim 3 wherein the zirconium silicate phase is colored by vanadium ions.

6. A process for producing the ceramic pigment of claim 1 comprising forming the sulfide, selenide or telluride of the zinc, mercury or cadmium or the mixed crystals thereof in situ and simultaneously enclosing them while forming the zirconium silicate by heating a mixture of zirconium silicate forming components and the zinc, mercury, or cadmium chalcogenide forming components at a temperature of at least 600°C.

7. A process according to claim 6 wherein the zinc, cadmium, mercury and sulfur are added as oxygen containing compounds.

8. A process according to claim 6 wherein the sulfur is added as sodium sulfite or sodium thiosulfate.

9. A process according to claim 6 wherein the enclosed phase to be formed during the process is 1 to 50 percent of the zirconium silicate.

* * * * *